Patented Jan. 8, 1952

2,581,390

UNITED STATES PATENT OFFICE 2,581,390

UNSATURATED ACID ESTERS OF OXYALKYLATED PHENOL-ALDEHYDE RESINS

Melvin De Groote, University City, and Bernhard Keiser, Webster Groves, Mo., assignors to Petrolite Corporation, Ltd., Wilmington, Del., a corporation of Delaware No Drawing. Application May 6, 1949,
Serial No. 91,883

8 Claims. (Cl. 260—52)

The present invention is concerned with certain new chemical products, compounds or compositions which have useful application in various arts. This application is a continuation-in-part of our co-pending application Serial No. 64,469, filed December 8, 1948. It includes methods or procedures for manufacturing said new chemical products, compounds or compositions themselves. Said new compositions are esters in which the acyl radical is that of an unsaturated resinophore monocarboxy acid having less than 8 carbon atoms, and the alcoholic radical is that of certain hydrophile polyhydric synthetic products; said hydrophile synthetic products being oxyalkylation products of (A) An alpha-beta alkylene oxide having not more than 4 carbon atoms and selected from the class consisting of ethylene oxide, propylene oxide, butylene oxide, glycide, and methylglycide; and (B) An oxyalkylation-susceptible, fusible, organic solvent-soluble, water-insoluble, phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

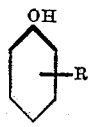

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

Although the herein described products have a number of industrial applications, they are of particular value for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending application Serial No. 91,882, filed May 6, 1949, now Patent 2,542,009, granted February 20, 1951. See also our co-pending application Serial No. 64,468, filed December 10, 1948, and now abandoned.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles such as sewage, coal washing waste water, and various trade wastes and the like; as germicides, insecticides, emulsifying agents, as, for example, for cosmetics, spray oils, water-repellent textile finishes; as lubricants, etc.

The oxyalkylated resins, used to provide the alcoholic radical of the new esters, are described in our Patent 2,499,370, granted March 7, 1950, and 2,542,009, granted February 20, 1951, and reference is made to these patents for a description of phenol-aldehyde resins to produce the alcoholic products. For specific examples of the resins, reference is made to Examples 1a through 103a of Patent 2,499,370. For examples of oxyalkylated products derived from these resins, reference is made to the tables in columns 31 through 46 of Patent 2,542,009.

The acids herein employed to form the esters are unsaturated resinophores having less than 8 carbon atoms and exemplified by acrylic acid, methacrylic acid, ethacrylic acid, crotonic acid, etc.

Having obtained an oxyalkylated resin of the kind described we convert such polyhydroxylated compound into a total or partial ester of an unsaturated monocarboxy acid of the kind herein specified. One need not use the acid as such, but can use any other obvious equivalent, such as the acylchloride, the anhydride, ester, etc. Actually, due to the ease with which these acids polymerize, it is more desirable to use the acid as such, or the ester of a low molal alcohol, such as the ester of methyl alcohol or ethyl alcohol. Using such ester as the source of the desired acidic radical, one need only employ the conventional alcoholysis reaction so as to form the desired derivative. In such reaction the low molal alcohol, i. e., methyl alcohol or ethyl alcohol, is eliminated. Our preference is to use the ethyl or methyl ester of acrylic acid or methacrylic acid, or to use crotonic acid.

Example 1c

In the preparation of the esters the oxyalkylated phenol-aldehyde resin, such as Example 104b of Patent 2,542,009, is employed. The equipment used is substantially the same as described under Example 1a of Patent 2,499,370. It consists essentially of a reaction flask, a stirrer, heating mantle, thermometer, reflux condenser and phase-separating trap. The equivalent weight of the oxyalkylated phenol-aldehyde resin can be determined by calculation from the hydroxyl value, or it can be estimated from the probable structure of the product based on the initial raw materials. In the procedure described, approximately 250 to 325 grams of the xylene-containing solution described under headings Examples of Patent 2,499,370, were employed, along with 200 grams of added xylene. To this mixture was added the selected acid in the stipulated amount, along with approximately 5% of para-toluene sulfonic acid as a catalyst. The mixture, including both reactants, the added xylene and a catalyst, was heated and stirred until the refluxing action started. Refluxing was continued until the theoretical amount of water had been collected in the trap, or until the evolution of water ceased. More than theoretical amount of water may be found in the trap, since the chemicals obtained contain a small amount of water as an impurity.

As a specific example, 322.6 grams of the xylene-containing oxyalkylated resin, Example 111b of Patent 2,542,009, are reacted with enough crotonic acid to neutralize one-fourth of the hydroxyl groups in the resin. In this case 7.1 grams of acid were employed. There was added also to the flask 200 grams of added xylene and 20 grams of para-toluene sulfonic acid as a catalyst. The mixture was heated at 140° C. for 3 hours, until 4.1 ml. of water were evolved.

Example 2c

The same procedure was used as in Example 1c, preceding, except that enough acid was used to neutralize one-half of the hydroxyl groups of the resin.

As a specific example, 210 grams of the xylene-containing resin 116b of Patent 2,542,009 were reacted with 13.8 grams of crotonic acid in the presence of 200 grams of additional xylene and 20 grams of para-toluene sulfonic acid at 140° C., until 9.2 grams of water were evolved. This took 4.5 hours.

Example 3c

The same procedure was used as in Example 1c, preceding, except that enough acid was used to neutralize three-quarters of the hydroxyl groups of the resin.

As a specific example, 240.3 grams of the xylene-containing resin 126b of Patent 2,542,009 were reacted with 25.6 grams of crotonic acid in the presence of 200 grams of additional xylene and 20 grams of para-toluene sulfonic acid as a catalyst. Reflux was at 141° C. for 5 hours. 15.1 ml. of water were evolved.

Example 4c

The same procedure was used as in Example 1c, preceding, except that enough acid was used to neutralize all of the hydroxyl groups of the resin. As a specific example, 252.6 grams of the xylene-containing resin 107b of Patent 2,542,009, were reacted with 25.9 grams of crotonic acid in the presence of 200 grams of additional xylene and 20 grams of para-toluene sulfonic acid as a catalyst. Reflux was at 144° C. for 6 hours. 7.6 ml. of water were evolved.

Example 5c

The same procedure was used as in Examples 1c to 4c, preceding, except that instead of using crotonic acid, methacrylic acid was used.

As a specific example 283 grams of the xylene-containing resin 107b of Patent 2,542,009 were reacted with 28.9 grams of methacrylic acid in the presence of 200 grams of additional xylene and 20 grams of para-toluene sulfonic acid as a catalyst. The mixture was refluxed at 144° C. for 3 hours until 8.0 ml. of water were evolved.

Example 6c

If desired, the reaction can be carried out also by trans-esterification. That is, the xylene-containing oxyalkylated phenol-aldehyde can be heated with an ester of an unsaturated acid in the presence of sodium methylate or para-toluene sulfonic acid as a catalyst until the corresponding alcohol is driven off. As a specific example, 75 grams of resin Example 106b of Patent 2,542,009 were reacted with 816 grams of methylacrylate in the presence of 0.6 gram of sodium methylate at 108° C. for 5 hours. 3 ml. of methyl alcohol were driven off.

Example 7c

The same procedure was followed as outlined in Example 6c, preceding.

As a specific example, 75 grams of resin 125b of Patent 2,542,009 were reacted with 8.6 grams of methyl acrylate in the presence of 0.6 gram of sodium methylate for one-fourth of an hour at 40° C. 1.1 ml. of methyl alcohol was obtained.

Example 8c

The same procedure was followed as outlined in Example 6c, preceding.

As a specific example, 0.6 gram of para-toluene sulfonic acid was used, instead of the sodium methylate, as outlined in Example 7c, preceding. The reaction was continued for 4 hours at 138° C. 3.2 ml. of methyl alcohol were obtained.

A number of additional examples are summarized in the following table: In all cases, 200 grams of additional xylene were used and 20 grams of para-toluene sulfonic acid were used as a catalyst.

| Ex. No. | Xylene Containing Resin Ex. No. of Patent 2,542,009 | Grams used | Xylene Present, Grams | Acid | Weight, Grams | Time, Hours | Temp., °C. | Water off, Grams |
|---|---|---|---|---|---|---|---|---|
| 9c | 111b | 322.6 | 77.4 | Crotonic | 28.4 | 5.5 | 141 | 8.7 |
| 10c | 112b | 237.5 | 62.5 | Methacrylic | 22.8 | 6.0 | 139 | 9.5 |
| 11c | 116b | 210.0 | 89.2 | Crotonic | 27.6 | 4.0 | 140 | 2.0 |
| 12c | 126b | 240.3 | 59.7 | ----do---- | 34.2 | 5.75 | 141 | 4.6 |
| 13c | 123b | 254.6 | 45.4 | ----do---- | 19.8 | 2.5 | 143 | 5.0 |
| 14c | 133b | 255.3 | 44.7 | ----do---- | 19.0 | 6.5 | 143 | 7.5 |
| 15c | 137b | 250.0 | 50.0 | ----do---- | 23.9 | 4.25 | 142 | 6.4 |
| 16c | 138b | 268.0 | 32.0 | Methyl acrylate | 20.5 | 5.0 | 144 | 6.5 |
| 17c | 117b | 233.0 | 67.0 | ----do---- | 22.7 | 6.5 | 143 | 4.3 |
| 18c | 128b | 262.2 | 37.8 | ----do---- | 21.5 | 6.0 | 141 | 8.2 |
| 19c | 118b | 254.8 | 45.2 | ----do---- | 19.2 | 4.25 | 143 | 6.3 |
| 20c | 127b | 253.8 | 46.2 | ----do---- | 26.7 | 3.75 | 143 | 7.5 |
| 21c | 128c | 262.2 | 37.8 | ----do---- | 21.5 | 3.75 | 142 | 8.2 |
| 22c | 108b | 262.0 | 38.0 | ----do---- | 21.5 | 3.5 | 140 | 8.0 |
| 23c | 117b | 264.0 | 67.0 | ----do---- | 22.7 | 3.0 | 144 | 7.0 |
| 24c | 122b | 228.7 | 71.3 | ----do---- | 12.6 | 2.0 | 140 | 4.1 |
| 25c | 131b | 248.4 | 51.6 | ----do---- | 30.0 | 2.25 | 145 | 9.0 |

Having thus described our invention, what we claim as new and desire to secure by Letters Patent is:

1. An ester in which the acyl radical is that of an unsubstituted alpha-beta mono-olefinic monocarboxy acid saturated except for the alpha-beta olefinic linkage and having less than 8 carbon atoms, and the alcoholic radical is that of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide; and (B) an oxyalkylation-susceptible, fusible, organic solvent-soluble, water-insoluble, phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula:

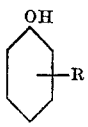

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

2. An ester in which the acyl radical is that of an unsubstituted alpha-beta mono-olefinic monocarboxy acid saturated except for the alpha-beta olefinic linkage and having less than 8 carbon atoms and the alcoholic radical is that of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide; and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula:

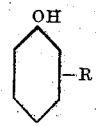

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; and with the final proviso that the hydrophile properties of the ester as well as the oxyalkylated resin in an equal weight of xylene are sufficient to produce an emulsion when said xylene solution is shaken vigorously with one to three volumes of water.

3. An ester in which the acyl radical is that of an unsubstituted alpha-beta mono-olefinic monocarboxy acid saturated except for the alpha-beta olefinic linkage and having less than 8 carbon atoms, and the alcoholic radical is that of certain hydrophile polyhydric synthetic products; said hydrophile synthetic products being oxyethylation products of (A) ethylene oxide; and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula:

in which R is a hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of the ester as well as the oxyethylated resin in an equal weight of xylene are sufficient to produce an emulsion when said xylene solution is shaken vigorously with one to three volumes of water.

4. An ester in which the acyl radical is that of an unsubstituted alpha-beta mono-olefinic monocarboxy acid saturated except for the alpha-beta olefinic linkage and having less than 8 carbon atoms and the alcoholic radical is that of certain hydrophile polyhydric synthetic products; said hydrophile synthetic products being oxyethylation products of (A) ethylene oxide; and (B) an oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than 2; said phenol being of the formula:

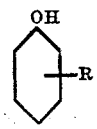

in which R is an aliphatic hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of the ester as well as the oxyethylated resin in an equal weight of xylene are sufficient to produce an emulsion when said xylene solution is shaken vigorously with one to three volumes of water.

5. The product of claim 4, wherein R is substituted in the para position.

6. The product of claim 4, wherein R is a butyl radical substituted in the para position.

7. The product of claim 4, wherein R is an amyl radical substituted in the para position.

8. The product of claim 4, wherein R is a nonyl radical substituted in the para position.

MELVIN DE GROOTE.
BERNHARD KEISER.

REFERENCES CITED

The following references are of record in the file of this patent:

UNITED STATES PATENTS

| Number | Name | Date |
|---|---|---|
| 2,178,829 | Bruson et al. | Nov. 7, 1939 |
| 2,499,365 | De Groote | Mar. 7, 1950 |